Patented Dec. 4, 1923.

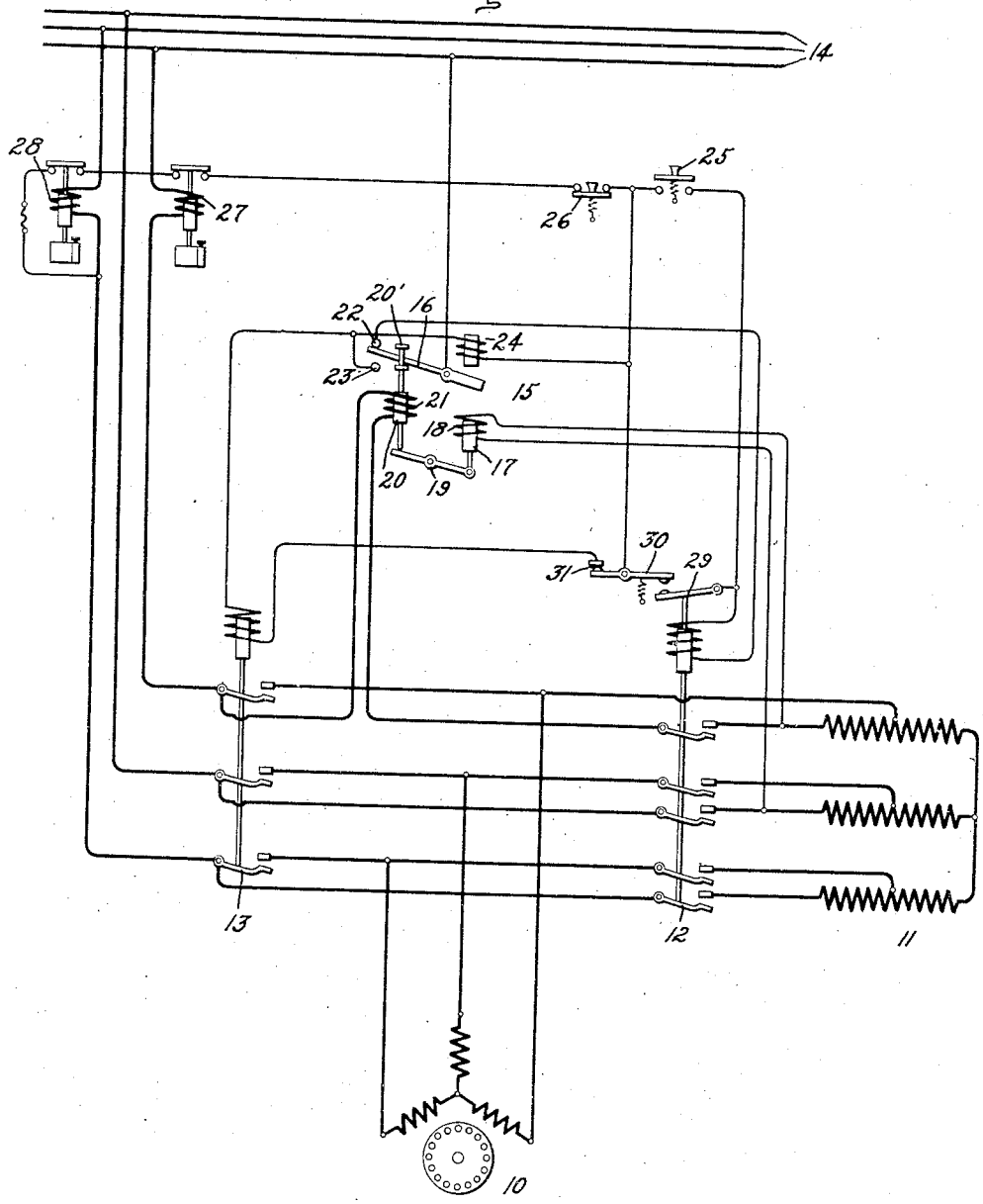

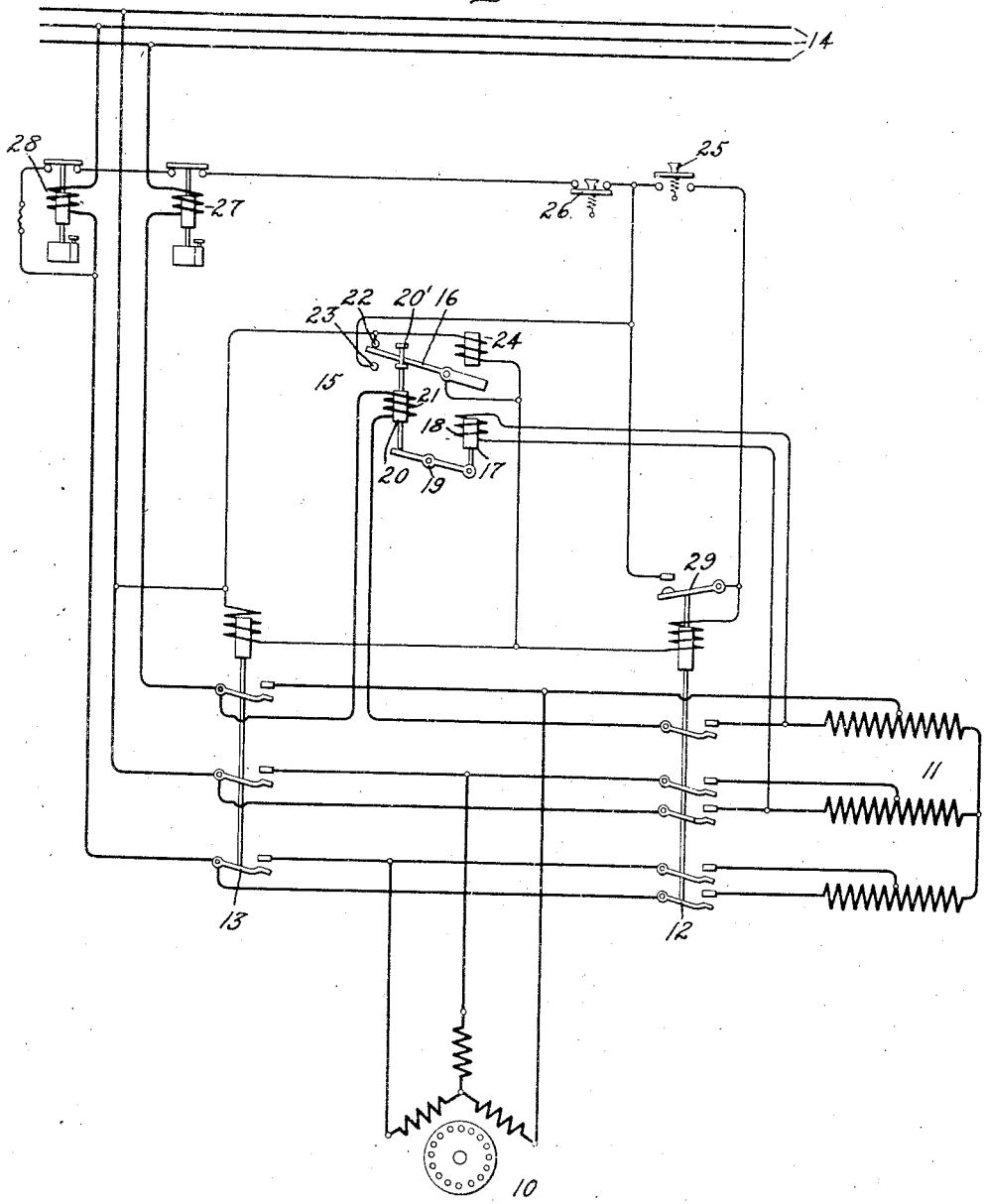

1,475,951

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

ELECTROMAGNETIC CONTROL.

Application filed March 5, 1921. Serial No. 449,788.

*To all whom it may concern:*

Be it known that I, BENJAMIN W. JONES, a citizen of the United States, residing at Schenectady, in the county of Schenectady, State of New York, have invented certain new and useful Improvements in Electromagnetic Controls, of which the following is a specification.

In certain of its aspects, my invention relates generally to improvements in starting arrangements for electric motors, and although applicable to all types of motors which are started step by step by first applying a reduced potential and then increasing the applied potential, the invention has a particular utility in the automatic starting of alternating current motors of the squirrel cage rotor type. A common arrangement for starting alternating current motors includes a starting compensator with low voltage taps to which the motor is first connected before being automatically connected directly to the source of supply for normal running. The invention has a particular utility in such starting arrangements, but it is not necessarily limited thereto.

One of the objects of the invention is to provide improved means for accelerating the motor. Although the invention has a particular application to the acceleration of the motor in accordance with the current taken by the motor, it is not necessarily limited thereto, but is applicable to manually controlled starting arrangements and also to the automatic starting of the motor with a definite time interval between the successive accelerating steps, or in accordance with any desired condition.

As will be pointed out particularly hereinafter, one of the features of the invention is applicable generally to the control of electromagnetic devices and is not limited in its use to starting arrangements for electric motors.

The invention has features of simplicity of construction and arrangement, and reliability and effectiveness, which will be pointed out particularly hereinafter.

For a better understanding of the invention, reference is had to the accompanying drawings which illustrate embodiments of the invention for purposes of illustration, and in which Fig. 1 shows a current limit automatic starting control for a three-phase induction motor of the squirrel cage type, and Fig. 2 is a modification of Fig. 1.

Referring to Fig. 1, it will be observed by those skilled in the art that I have illustrated in very diagrammatic form an embodiment of my invention in an automatic starting arrangement for a three-phase squirrel cage rotor type induction motor 10 by means of the well known starting compensator 11 which has low voltage taps for connecting the motor to the source of supply at a reduced potential for starting. The electromagnetic accelerating switch 12 is adapted to connect the motor to a source of supply through a reduced potential tap of the starting compensator 11, and the electromagnetically operated accelerating switch 13 is provided for connecting the motor directly to the source of supply 14. These electromagnetically operated switches are successively operated, and for purposes of convenience I shall designate the switch 12 as a "starting" switch or contactor and the switch 13 as a "running" switch or contactor. These starting and running switches are controlled by means of a relay 15 which is provided with a switch member 16 for controlling the energization of the starting and running switches. In the embodiments of my invention selected for purposes of illustration of certain aspects of my invention, the switch member 16 is controlled responsively to the current taken by the motor, but my invention is not necessarily limited to current limit control. In the arrangement of the drawing, the switch member is mechanically held in the upper position by means of the plunger 17 of an electromagnet 18 operating through the lever 19 on the plunger 20 of an electromagnet having a winding 21 energized in accordance with the current taken by the motor at starting. The switch member 16 is adapted to make engagement with a stationary contact 22 in its upper or first position, and is adapted to make engagement with a stationary contact 23 in its lower or second position. The switch member is biased to the first position and is mechanically held in that position until mechanically moved to the second position in response to the energization of the winding 18 which places the switch member under the control of the motor current; that is, under the control of the plunger 20 and the winding 21. An electromagnet 24 is provided for cooperating with the plunger 20 and for magnetically holding the switch member in the second position after it has moved thereto to prevent the return to the first position upon the deenergization of winding 18 and to prevent vibration to which apparatus of this sort is ordinarily subject from opening the circuit of the switch member at the contact 23.

A normally opened start push button 25 is provided and a normally closed stop push button 26 is provided for controlling the motor at the will of the operator or in accordance with any desired conditions. Overload relays 27 and 28 are provided for opening the circuit of the windings of the starting and running switches in case the current taken by the motor exceeds a predetermined value. An auxiliary switch 29 is connected to the starting switch 12 for the purpose of short circuiting the contacts of the start push button 25 after the starting switch has been closed so as to render it unnecessary to maintain the start push button closed after the starting switch has closed, and another auxiliary switch comprising the pivoted switch member 30 controlling the contacts 31 is provided for opening the winding of the running contactor while the starting contactor is closed.

The operation of my invention as thus constructed and arranged, and with the parts in the various positions shown in the drawing, is as follows: When the start push button 25 is depressed so as to make engagement with its contacts, the winding of the starting switch is energized through a circuit including the contacts of the overload relays 28 and 27, stop push button contacts, start push button contacts, winding of the starting switch, upper contact 22 of relay 15 and switch member 16 of the relay, to another conductor of the three-phase source of supply. The starting switch will close and connect the motor to the reduced potential taps of the starting compensator 11, and in closing will operate the auxiliary switch to open the circuit for the running winding at contacts 31. The motor will be energized at a potential which is less than that of the source of supply 14. The auxiliary switch 29 will be closed upon the closing of the starting switch so as to permit the start push button 25 to be released. The winding 18 of the current limit relay will be energized to raise the armature 17 and thereby release the switch member so as to be placed under the control of the plunger 20 and the current limit winding 21 which is energized in accordance with the current taken by the motor.

As soon as the current taken by the motor has dropped to the predetermined value, the plunger 20 will drop, and, after an interval, the collar 20' on the plunger will engage the switch member 16 and move the same to the second position. The winding of the starting switch will thereby be deenergized and the winding of the running switch 13 will be energized, the circuit for the running switch being through the contacts of the overload relays, the stop push button 26, auxiliary switch contacts 31, winding of the running switch 13, lower contact 23 of the relay, switch member 16, to another conductor of the three-phase source of supply. The starting switch will open and the running switch will close so as to connect the motor directly to the source of supply at full potential. The holding electromagnet 24 which was deenergized when the switch member 16 was in its upper position is now energized to hold the switch member in its second or lower position. The motor may be stopped by depressing the stop push button 26. In case there is a failure of voltage, the holding electromagnet 24 will be deenergized and the switch member 16 will be moved to the first position by the plunger 20 which will be raised by means of the plunger 17 of the electromagnet 18. The running switch will also be opened. In order to start the motor after a failure of voltage, it is necessary to again depress the start push button 25.

Referring to Fig. 2, similar reference characters denote similar parts. This arrangement is a modified form of the arrangement of Fig. 1, and it is believed will be readily understood by those skilled in the art from a description of the operation of the same. With the parts in the various positions shown in the drawing, in order to start the motor, start push button 25 is closed, thereby energizing the winding of the starting switch 12 through a circuit including the contacts of the overload relays 28 and 27, stop push button 26, start push button 25, winding of starting switch, switch member 16, relay contact 22, to the middle conductor of the three-phase source of supply. The motor will now be energized from the source of supply through the low voltage taps of the auto-transformer, and the electromagnet winding 18 will be energized to lift the plunger 17 so as to release the plunger 20 to drop under the control of the current limit winding 21. The closing of the starting switch establishes a shunt circuit around the contacts of the start push button 25 through the contacts of the auxiliary switch 29.

In this particular form of my invention, the winding of the running switch and the electromagnet 24 are connected in multiple relation and are short circuited by the switch member 16 in the first position, and the winding of the starting switch is connected in series relation to the winding of the running switch. When the current taken by the motor has dropped to the predetermined value, the plunger 20 will drop and after an interval the switch member 16 will be engaged by the collar and caused to drop into engagement with the contact 23, thereby short circuiting the winding of the starting switch and energizing the winding of the running switch and the magnet 24. After the switch member 16 is moved out of engagement with the contact 22 and before it makes engagement with the contact 23, the winding of the starting contactor has a holding circuit through the winding of the running contactor and the magnet 24. The starting contactor will be maintained closed until the switch member 16 makes engagement with the contact 23, by reason of the series relation of the windings and by reason of the fact that when the starting contactor is closed and the running contactor is open, the greater part of the potential drop in the circuit will be in the winding of the starting contactor and the ampere turns will be sufficient to maintain the starting contactor closed. In the intermediate positions of the switch member, the magnet 24 will be energized at a reduced potential to attract the right-hand end of the switch member to assist the plunger 20 in moving the switch member to the second position. When the switch member first makes engagement with the contact 23, full potential is applied to the winding of the running contactor and the magnet 24, and the winding of the starting contactor is short circuited. The running switch will be energized through a circuit including the contacts of the overload relays 28 and 27, stop push button 26, contact 23, switch member 16, winding of the running switch 13, through to the middle conductor of the three-phase source of supply, but the running contactor will not be energized to close until the starting contactor opens for the reason that the drop across the starting winding must be reduced before the running winding will be sufficiently energized. The holding electromagnet 24 will also be energized through the switch member 16 in multiple with the winding of the running contactor 13 to exert full holding force on the switch member. When the starting contactor is deenergized, it will open and open the auxiliary switch 29, thereby disconnecting the winding of the starting contactor from the source of supply.

Although I have illustrated my invention in connection with two successively operated switches for controlling an alternating current motor of the squirrel cage rotor type, my invention is not necessarily limited thereto, as will be understood by those skilled in the art, but is applicable generally to the automatic starting of an electric motor where one electromagnetic switch connects the motor to a source of supply to a reduced potential for starting and the second electromagnetic switch applies a higher potential to the motor.

One of the difficulties heretofore encountered has been that after the accelerating relay starts to operate, the arrangement is placed in the original position. Thus, in former arrangements, after the switch member of the accelerating relay moves away from the first position, the starting switch is opened, and that will cause the relay to return to the first position. One of the difficulties heretofore encountered has been to insure that the switch member of the relay will positively move from the first to the second position. The provision of the collar 20' on the plunger 20 permits the switch member to remain in the first position until the motor current has dropped to the predetermined value, and then the switch member is struck a hammer blow which quickly carries it to the second position where it is held by the magnet 24. In the arrangement of Fig. 2, the magnet 24 is energized in the intermediate positions of the switch member to assist in moving the switch member, and also the starting contactor is not opened until the switch member is in its second position.

The features of controlling the two electromagnetic switches by means of a switch member which in one position short circuits one electromagnet winding and applies full potential to the other electromagnet winding, which in intermediate positions connects both magnet windings across the source of supply so that the second has a holding circuit through the first, and in the second position full potential is applied to the first winding and the second winding is short circuited, is applicable generally to the control of electromagnetic devices.

In accordance with the provisions of the patent statutes, I have described the principles of operation of my invention, together with the apparatus which I now consider to represent the best embodiment thereof, but I desire to have it understood that the apparatus shown in only illustrative and that the invention can be carried out by other means.

What I claim as new and desire to secure by Letters Patent of the United States, is:—

1. Motor controlling means comprising two electromagnetic switches, a relay having a switch member biased to and mechanically held in a position to energize the first of said switches, the said relay having electroresponsive means for releasing the switch member and operating the same to a second position to energize the second of said switches, an electromagnet forming a part of the said relay for holding the switch member in the second position, and connections whereby the said electroresponsive means is energized to release and operate the said switch member to the second position after the first of said switches closes.

2. Motor controlling means comprising two electromagnetic switches, a relay having a switch member biased to a position to energize the first of said switches, the said relay having electroresponsive means for operating the switch member to a second position to energize the second of said switches an interval after the closing of the first of said switches, and a normally deenergized electromagnet which is energized when the said switch member leaves the first position for assisting the said electroresponsive means in moving the said switch member to the second position and for holding the switch member in the second position.

3. Motor controlling means comprising two electromagnetic switches, a relay having a switch member biased to and held in a position to energize the first of said switches, the said relay having electromagnetic means comprising a current coil, a releasing coil and a holding coil, and connections whereby the said releasing coil is energized to release the switch member to be operated to the second position under the control of the current coil after the first of said switches closes and the holding coil is energized in the second position of the switch member to hold the switch member in the second position.

4. Motor controlling means comprising two electromagnetic accelerating switches, a switch member biased to one position for controlling the said switches, electromagnetically controlled means energized responsively to the motor current for automatically moving the switch member to a second position under the control of the motor current, an electromagnet for holding the switch member in the second position, and connections whereby the first electromagnetic switch is energized in the first position of the switch member, and the second electromagnetic switch and the said electromagnet are energized in the second position of the switch member.

5. Motor controlling means comprising two electromagnetic accelerating switches, a current limit relay for controlling the said switches, the said relay having a switch member mechanically held in one position and mechanically moved to a second position under the control of the motor current after the closing of the first electromagnetic switch, an electromagnet for holding the switch member in the second position, and connections whereby the first electromagnetic switch is energized in the first position of the switch member and the second electromagnetic switch and the said electromagnet are energized in the second position of the switch member.

6. Means for connecting a translating device to a source of supply comprising two electromagnetic switches having their windings connected together in series relation, a switch member having two definite positions for energizing one of said electromagnetic switches in each position, and connections whereby the said switch member in each position operatively energizes the winding of one of said switches from the source of supply and short circuits the winding of the other switch and in the intermediate position maintains one of said switches in the operated position by an energizing circuit including the winding of the other of said switches.

7. An electromagnetic control arrangement comprising two electromagnetically operated switches for controlling the connection of a translating device to a source of supply, a separately operable switch member having two operative positions for controlling the said switches, and connections whereby in the first position of the switch member substantially the full potential of the source of supply is applied to the winding of the first of said switches and the winding of the second of said switches is short circuited, in intermediate positions of the switch member the winding of the first switch is energized through a circuit including the winding of the second switch, and in the second position of the switch member substantially full source of supply potential is applied to the winding of the second switch and the winding of the first switch is deenergized.

8. Motor controlling means comprising two electromagnetic switches having their windings connected together in series relation, a relay for controlling the said switches, the said relay having a switch member biased to one position and means for automatically moving the switch member to a second position after the motor has started, and connections whereby in each position of the switch member one of said electromagnetic switches is operatively energized and the winding of the other of said switches is deenergized, and in intermediate positions the first switch is maintained operatively energized through a circuit including the winding of the second switch.

9. Motor controlling means comprising two electromagnetic switches, an accelerating relay for controlling the said switches, the said relay having a switch member biased to one position and movable by the operation of the relay in response to a predetermined motor operating condition to a second position, and connections whereby in each position of the switch member one of said electromagnetic switches is operatively energized and the winding of the other switch is short circuited, and in intermediate positions the winding of the first switch is maintained operatively energized through a circuit including the winding of the second switch.

10. Motor controlling means comprising two electromagnetic accelerating switches, a switch member biased to one position and movable under the control of motor current to a second position for controlling the said switches, and connections whereby the winding of the first of said switches in energized and the winding of the second switch is short circuited in the first position of the switch member, in intermediate positions of the switch member the winding of the first switch has a holding circuit through the winding of the second switch, and the winding of the second switch is energized and the winding of the first switch is short circuited in the second position of the switch member.

11. Motor controlling means comprising two electromagnetic switches, a current limit relay for controlling said switches, the said relay having a switch member biased to one position and movable under the control of the motor current to a second position, a magnet for holding the switch member in the second position, and connections whereby the winding of the first of said switches is energized and the said magnet and the winding of the second of said switches are short circuited in the first position of the switch member, and the winding of the second of said switches and said magnet are energized and the winding of the first switch is short circuited in the second position of the switch member.

12. Motor controlling means comprising two electromagnetic accelerating switches, a switch member biased to one position for controlling the said switches, electromagnetic means for moving the switch member to a second position under the control of the motor current, an electromagnet cooperating with the said electromagnetic means for moving the switch member and holding the same in the second position, and connections whereby the first electromagnetic switch is energized in the first position of the switch member, both electromagnetic switches and the said electromagnet are energized in positions of the switch member intermediate the two positions, and in the second position thereof the second electromagnetic switch and the said electromagnet are energized and the first electromagnetic switch is de-energized.

13. Motor controlling means comprising two electromagnetic accelerating switches, a switch member biased to one position for controlling the said switches, electromagnetic means for moving the switch member from the first to a second position under the control of the motor current, an electromagnet cooperating with the said electromagnetic means for moving the switch member and holding the same in the second position, and connections whereby the winding of the first of said switches is energized and the winding of the second switch and the said electromagnet are short circuited in the first position of the switch member, the winding of the second of said switches is energized through a circuit including the winding of the first of said switches and the said electromagnet at positions of the switch member intermediate its two definite positions, and at the second position of the switch member the winding of the first of said switches is short circuited and substantially full potential is applied to the winding of the second of said switches and the said electromagnet.

In witness whereof, I have hereunto set my hand this 4th day of March, 1921.

BENJAMIN W. JONES.